United States Patent

Mittler et al.

(10) Patent No.: US 10,125,870 B2
(45) Date of Patent: Nov. 13, 2018

(54) PISTON RING

(71) Applicant: FEDERAL-MOGUL BURSCHEID GMBH, Burscheid (DE)

(72) Inventors: Richard Mittler, Burscheid (DE); Joern Proepper, Leverkusen (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 0 days.

(21) Appl. No.: 15/321,844

(22) PCT Filed: Jun. 10, 2015

(86) PCT No.: PCT/EP2015/062904
§ 371 (c)(1),
(2) Date: Dec. 23, 2016

(87) PCT Pub. No.: WO2015/197361
PCT Pub. Date: Dec. 30, 2015

(65) Prior Publication Data
US 2017/0130840 A1    May 11, 2017

(30) Foreign Application Priority Data

Jun. 26, 2014    (DE) .................. 10 2014 108 973

(51) Int. Cl.
*F16J 9/20*    (2006.01)

(52) U.S. Cl.
CPC ..................... *F16J 9/20* (2013.01)

(58) Field of Classification Search
CPC ..................... F16J 9/00; F16J 9/12; F16J 9/20
See application file for complete search history.

(56) References Cited

U.S. PATENT DOCUMENTS

| | | | |
|---|---|---|---|
| 337,938 A | | 3/1886 | Dunning |
| 4,123,072 A | * | 10/1978 | Sharpe ................... B23P 15/06 |
| | | | 277/453 |
| 4,438,937 A | | 3/1984 | Moriarty |
| 4,681,326 A | * | 7/1987 | Kubo ........................ F16J 9/12 |
| | | | 277/447 |
| 4,736,586 A | * | 4/1988 | Kawajiri ............... F02G 1/0535 |
| | | | 277/451 |
| 5,695,199 A | * | 12/1997 | Rao .......................... F16J 9/20 |
| | | | 277/455 |
| 5,901,963 A | * | 5/1999 | Hite .......................... F16J 9/20 |
| | | | 277/321 |

(Continued)

FOREIGN PATENT DOCUMENTS

| | | |
|---|---|---|
| FR | 789 851 A | 11/1935 |
| GB | 522 024 A | 6/1940 |

*Primary Examiner* — Gilbert Y Lee
(74) *Attorney, Agent, or Firm* — Robert L. Stearns; Dickinson Wright, PLLC

(57) ABSTRACT

A piston ring for a piston of a piston engine has an external circumferential surface (2), and internal circumferential surface (4), and upper flank (6) pointing in the direction of the piston upper side, and a lower flank (8) pointing in the direction of the piston underside. The lower flank (8) runs obliquely with respect to the upper flank (6), so that axial height (A) of the piston ring is grater at the external circumferential surface (2) than the axial height (B) at the internal circumferential surface (4), and wherein on each side of the thrust of the piston ring at least one recess (10) is provided in the upper flank (6).

7 Claims, 4 Drawing Sheets

(56) References Cited

U.S. PATENT DOCUMENTS

| 7,017,914 B1* | 3/2006 | Sytsma | F16J 9/20 |
| | | | 277/452 |
| 2006/0151959 A1* | 7/2006 | Meller | F16J 9/08 |
| | | | 277/493 |

* cited by examiner

PISTON RING

BACKGROUND

1. Technical Field

The present invention relates to a piston ring with improved bearing-, wear- and oil scraping behaviour. The invention relates in particular to a piston ring which is adapted to compensate the piston groove tilting which occurs during operation of a piston engine.

2. Related Art

The piston of an internal combustion engine deforms during operation under the influence of the combustion heat and the temperature distribution resulting therefrom in axial direction differently. The highest temperatures prevail at the combustion chamber side, whilst the temperature decreases in the direction of the crankcase. The consequence of this is a tilting of the piston ring grooves, so that the flanks of the piston ring groove have a downward gradient in relation to the cylinder axis.

The piston ring situated in the piston ring groove lies with its lower flank under the influence of the combustion pressure with its entire surface against the lower flank of the piston groove and therefore assumes with its cross-section the same inclination as the groove. The result of this is that the pivot point of the piston ring running surface moves upward and thereby changes the hydrodynamic characteristics, accompanied by changed bearing-/wear behaviour toward the upper running edge, increased oil film thicknesses and poorer oil scraping behaviour.

A known solution to this problem consists in manufacturing the groove flanks of the piston with a corresponding downward gradient, which compensates this effect, so that during operation under the influence of temperature the groove flanks place themselves perpendicularly to the cylinder running path. In other words, the piston ring grooves are not constructed with a rectangular cross-section with flanks perpendicular to the cylinder running path, but rather with a trapezoidal cross-section with flanks oblique to the cylinder running path (respectively in thermally non-deformed state). However, this involves an increased manufacturing expenditure in the production of the piston and is therefore disadvantageous compared to piston ring grooves with a conventionally rectangular cross-section.

SUMMARY OF THE INVENTION

The object of the present invention therefore consists of providing a piston ring which compensates the effect of the groove tilting in a piston with conventional grooves with a rectangular cross-section. This is able to be realized in a more cost-efficient and simpler manner than the known solution of adapted piston ring grooves, in addition engines with conventional pistons can thus also be subsequently equipped with improved piston rings.

According to an aspect of the invention, a piston ring for a piston ring of a piston engine is provided, comprising:
an external circumferential surface;
an internal circumferential surface;
an upper flank pointing in the direction of the piston upper side; and
a lower flank pointing in the direction of the piston underside;
wherein
the lower flank runs obliquely with respect to the upper flank, so that the axial height of the piston ring is greater at the external circumferential surface than at the internal circumferential surface; and
wherein on each side of the thrust of the piston ring at least one recess is provided in the upper flank.

In order to counteract the effect of the groove tilting, a piston ring with compensation of the piston groove tilting is proposed. For this, the ring is equipped on its outer diameter with a greater axial height, whereas the height at the inner diameter is given the nominal height. The increased axial height at the outer diameter is to be selected so that the lower flank of the ring is given the same downward gradient as the groove during operation of the engine.

As a result of the increased height on the external circumferential surface, the axial play or respectively the distance between ring and groove is reduced there. This results in a reduced gas flow at this location and therefore a reduced build-up of pressure at the upper flank and the internal circumferential surface. This is a disadvantage, because therefore the piston ring is no longer pressed optimally against the cylinder wall or respectively bush in the particularly critical thrust region in this respect, and the gas-tightness therefore decreases. Thereby, inter alia, increased blow-by losses occur.

This is compensated according to the invention in that at least one recess, e.g. in the form of a depression, is introduced in each case into the upper flank of the ring at least on the circumference in the region of the thrust ends. Thereby, the distance between upper flank of the piston ring and the upper groove flank is increased in a targeted manner or respectively approximated to the value which would be present in a conventional piston ring. As a result, the gas flow is increased, so that the piston ring is again pressed in the desired manner against the cylinder wall or respectively bush.

According to an embodiment, the recesses extend into the external circumferential surface.

The recess according to the invention can be arranged only in the upper flank or can also extend into the external circumferential surface.

According to an embodiment, a plurality of recesses, spaced apart from one another, are provided on each side of the thrust.

In order to influence the gas flow in the desired manner, further recesses of identical form can be introduced at specific intervals into the upper flank.

According to an embodiment, the recesses are arranged in a range of 0-90° on both sides from the thrust.

According to an embodiment, the distance of the recesses from the internal circumferential surface is at least ⅓ of the radial length of the upper flank. Or, in other words, the recesses extend over a maximum of ⅔ of the radial wall thickness out from the external circumferential surface.

According to an embodiment, the upper flank forms a right angle with the internal circumferential surface.

According to an embodiment, the taper of the lower flank is adapted to compensate the tilting of the corresponding piston groove of the piston during operation of the piston engine.

The inclination of the lower flank of the piston ring is preferably designed so that during the groove tilting occurring in operation this is substantially compensated.

Preferably, the dimensions of axial depth and/or radial width and/or tangential length of the recesses depend on the distance to the ring thrust and/or on the radial distance from the inner side of the piston ring. Alternatively or additionally, it is preferred that the number and/or the distances of the recesses depend on the distance to the ring thrust and/or on the radial distance from the inner side of the piston ring.

DETAILED DESCRIPTION

Figure 1:
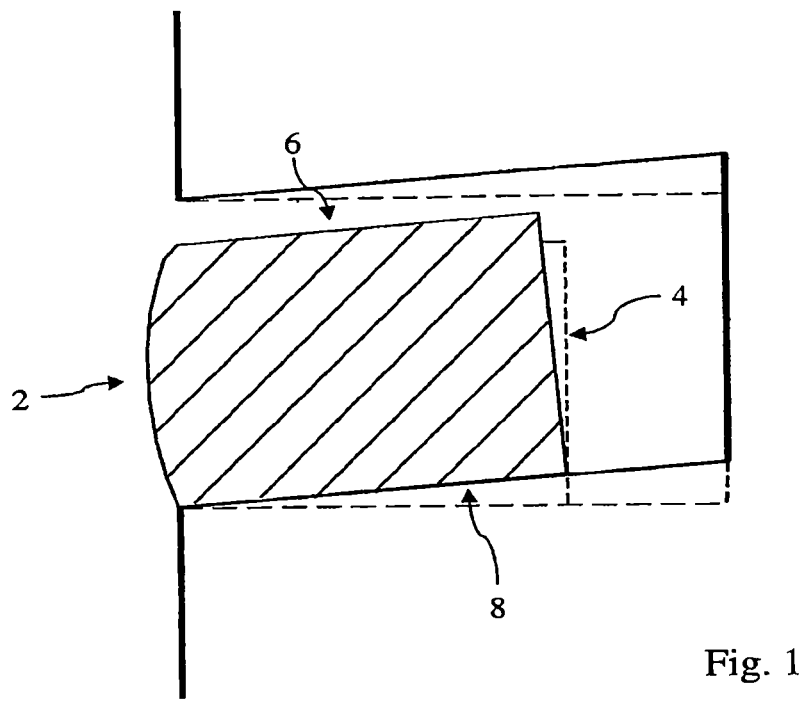
FIG. 1 is a cross-sectional view of a conventional piston ring in a tilted ring groove.

In FIG. 1 a conventional piston ring with rectangular flanks running in a parallel manner is shown. The situation with a non-tilted piston ring groove is illustrated in dashed lines. In cold state of the engine concerned, the geometry of the piston ring groove is rectangular. Through the different thermal stresses in axial direction during operation of the engine (high thermal stress at the piston crown, diminishing thermal stress in the direction of the cylinder block) different thermally caused deformations occur. Thereby, the ring groove tilts in the manner shown by solid lies (not necessarily true to scale).

In the operation of the engine, through the gas pressures occurring on the combustion, gas enters past the upper flank 6 of the piston ring into the space between ring groove and piston ring. Thereby, the piston ring is pressed downward and outward in the desired manner, in order to seal against the cylinder wall or respectively bush. The conventional piston ring likewise embodied with a rectangular geometry places itself through this effect by its lower flank 8 with its full surface against the lower flank of the piston ring groove. As the piston ring groove is tilted by the thermal influences and its lower flank therefore runs obliquely, this brings about a rotation of the piston ring in relation to the situation with a cold engine.

The pivot point of the piston ring, i.e. the contact point of the convex running surface with the cylinder wall/-bush, thereby travels upwards with respect to the non-deformed state. This leads to an impairment of the hydrodynamic characteristics, the bearing- and wear behaviour is displaced or respectively increased in the direction of the upper flank 6 of the piston ring. Greater oil film thicknesses occur and a deteriorated oil scraping behaviour through the greater distance of the lower running edge of cylinder wall or respectively bush accompanying the rotation.

Figure 2:
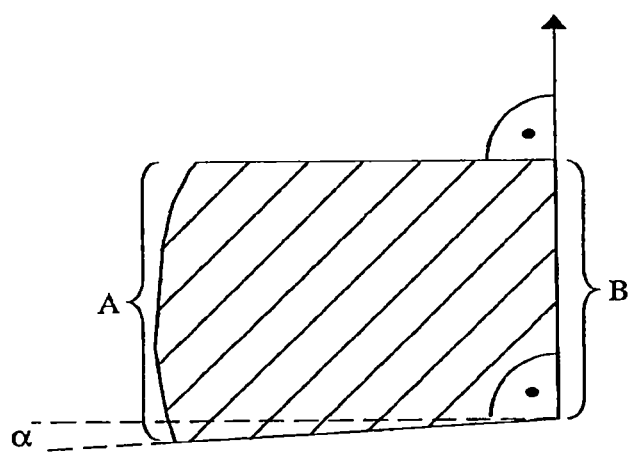
FIG. 2 is a cross-sectional view of a piston ring with a chamfered lower flank according to the invention.

According to the invention, this is remedied in that a piston ring is provided with an oblique lower flank 8. The ring has on the external circumferential surface a greater axial height A than the axial height B on the internal circumferential surface. The increased axial height A on the external circumferential surface is to be selected here so that the lower ring flank 8 is given the same downward gradient α as the ring groove in the tilted state. Such a piston ring is shown in cross-section in FIG. 2.

Thereby, it is achieved that in operation of the engine the piston ring lies, as provided, against the cylinder wall or respectively bush. The above-mentioned effects which impair the efficiency of the engine, are thereby prevented.

Figure 3:
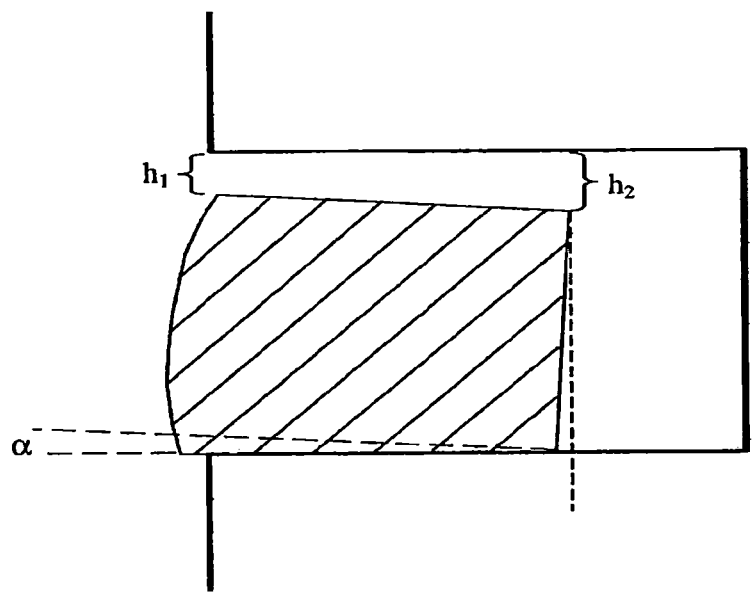
FIG. 3 is a cross-sectional view of a piston ring of FIG. 2 in a non-tilted ring groove.
Figure 4:
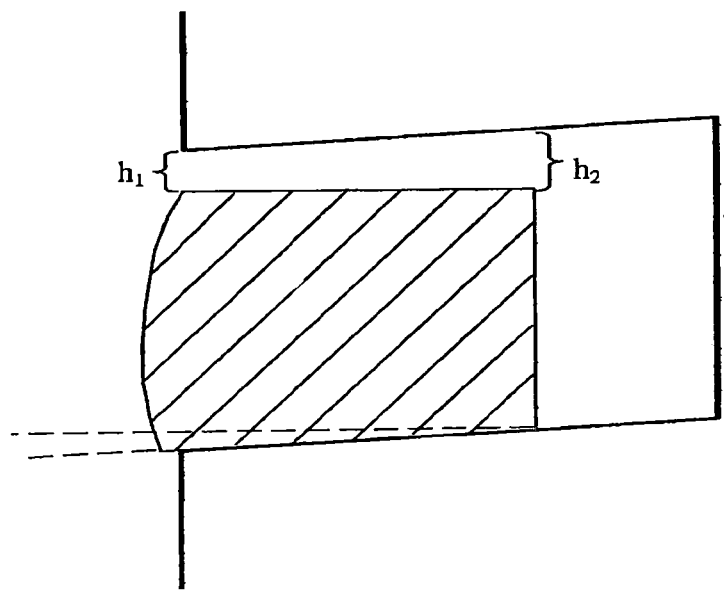
FIG. 4 is a cross-sectional view of the piston ring of FIG. 3 in the tilted ring groove.

However, this altered geometry leads to the fact that on the external circumferential surface 2 the axial play between ring groove and piston ring is reduced compared to the conventional rectangular piston ring or respectively the play on the internal circumferential surface 4 ($h_1 < h_2$), as can be seen in FIGS. 3 (non-tilted ring groove) and 4 (tilted ring groove). This results in a reduced gas flow and therefore the pressure on the upper flank 6 and the internal circumferential surface 4 of the piston ring is reduced. The desired effect of the applying under combustion pressure onto the cylinder wall or respectively bush is thus also reduced, which leads to a greater distance of cylinder wall or respectively bush. Again, greater oil film thicknesses, reduced tightness and deteriorated oil scraping behaviour can result therefrom. This occurs in particular in the region of the ring thrust.

According to the invention it is therefore furthermore proposed to provide on each side of the thrust of the piston ring at least one recess 10 in the upper ring flank. Through the recess 10, the play or respectively the distance between the upper flank of the ring groove and the upper flank 6 of the piston ring is increased locally. Thereby, the gas flow is increased, so that the piston ring can be pressed again in the desired manner by the combustion pressure against the cylinder wall or respectively bush. Several example embodiments are shown in FIGS. 5-7.

Figure 5:
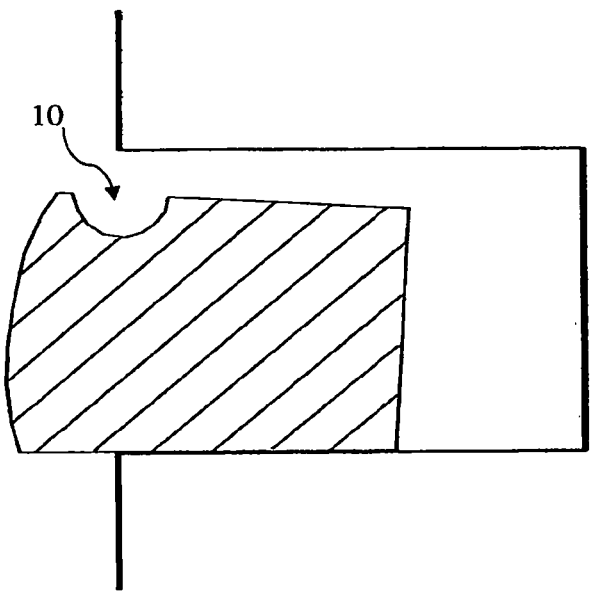
FIG. 5 is a cross-sectional view of a piston ring according to an embodiment in a non-tilted ring groove.

FIG. 5 shows a variant in which the recess 10 is embodied so as to be substantially semi-circular. The recess is situated only in the upper flank 6 of the piston ring, i.e. it does not project into the running surface 2. In the preferred, embodiment shown here, the recess 10 is arranged such that it lies substantially centrally under the upper edge of the ring groove. This variant is suitable in particular for piston rings with a sufficiently great projection over the ring groove. It is advantageous here that the running surface 2 remains untouched.

It generally applies that, in order to counteract the throttling of the gas flow, the recess(es) in the region of the narrowest site between groove and ring is/are to already have a certain depth in axial direction. The aim here is to enlarge the cross-section perpendicularly to the gas flow direction.

Figure 6:
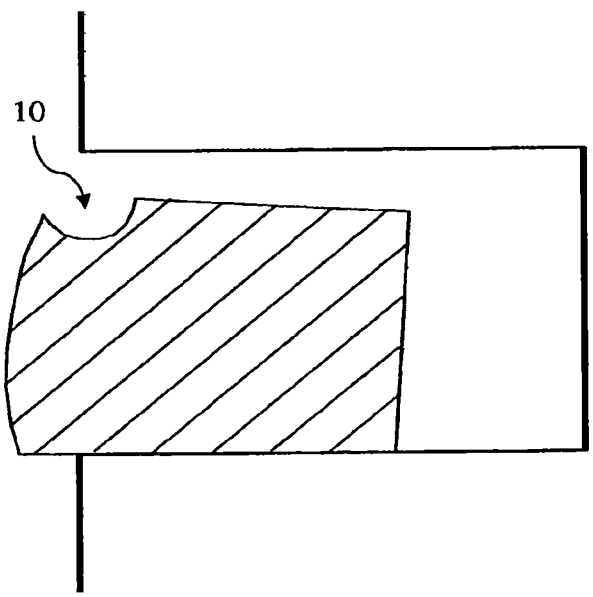
FIG. 6 is a cross-sectional view of a piston ring according to another embodiment in a non-tilted ring groove.
Figure 7:
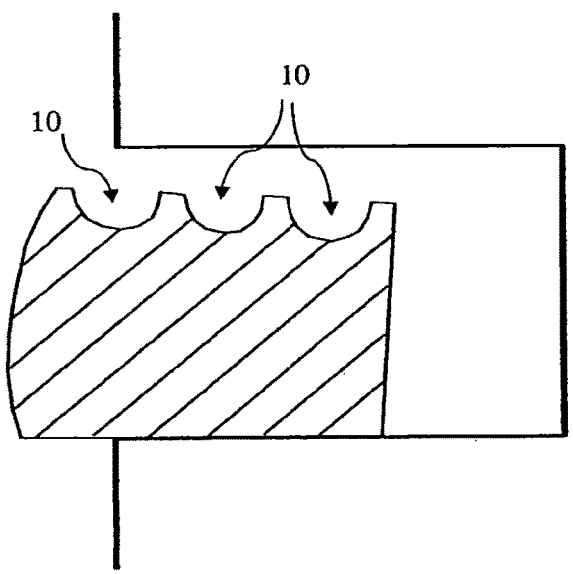
FIG. 7 is a cross-sectional view of a piston ring according to a further embodiment in a non-tilted ring groove.

FIG. 6 shows a variant in which the recess 10 also projects partially into the running surface 2 of the piston ring. This variant is suitable in particular for piston rings which only protrude relatively little over the groove. By the projecting into the running surface 2, a sufficient distance to the ring groove is nevertheless created and therefore sufficient space for the passage of gas. It can be disadvantageous here that the area of the running surface 2 is at least locally reduced.

FIG. 7 shows a further variant, in which in this case three recesses 10 are arranged one behind the other in radial direction. This serves to reinforce the gas passage. The shape, depth, number and the distances of recesses 10 both in radial and also in tangential direction are variable and can be configured in a flexible manner. Thus, for instance, the axial depth of the recesses with arrangement radially one behind the other can be designed so as to be decreasing in the direction of the inner side of the ring (not shown).

Figure 8:
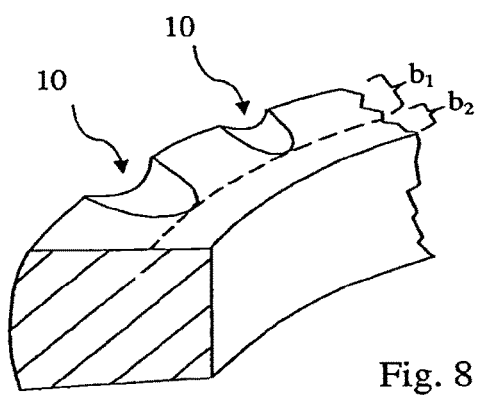
FIG. 8 is a three-dimensional cross-sectional view of a piston ring according to the embodiment of FIG. 6.

FIG. 8 shows an embodiment according to which the recesses 10 are provided both in the running surface 2 and also the upper flank 6 of the piston ring, wherein the radial dimension is selected so that it is a maximum of ⅔ of the radial width of the piston ring. As can also be seen here, in this embodiment the depth and also the tangential width of the recesses 10 are reduced in the direction of the internal circumferential surface of the piston ring.

By corresponding variation of the parameters "dimensions" and "distances" of the recesses, the contact pressure by the combustion can be adjusted in a flexible manner, e.g. as a function of the distance from the ring thrust, as a function of the local pre-stressing etc. This can take place on the one hand by the provision of more (in radial direction) recesses at sites which lie closer to the thrust, or by smaller distances of the recesses in the direction towards the thrust, or by corresponding selection of a greater axial depth/radial width/tangential length as a function of the distance to the ring thrust. A further possible alternative is a single long recess in tangential direction per side of the ring thrust, wherein this then varies in its dimensions "axial depth"/"radial width"/"tangential length" so that as a function of the distance to the ring thrust the contact pressure on cylinder wall or respectively bush is adjusted accordingly.

Figure 9:
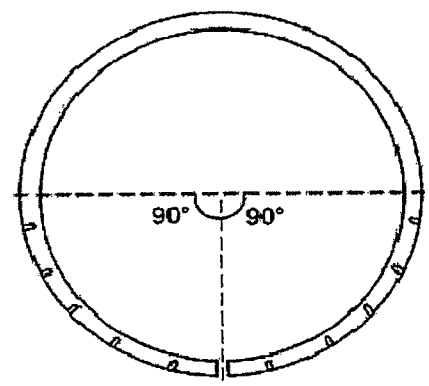
FIG. 9 shows in a top view onto an embodiment of a piston ring the angle distribution of the recesses in relation to the ring thrust.

The thrust ends differ from the ring backs lying opposite by a poorer adaptability to the cylinder curvature, because the piston ring is "softer" at the thrust ends than at the ring back. The radial pressure distribution is therefore dependent on the position on the piston ring in relation to the thrust ends or respectively the ring back. As it is therefore primarily necessary at the ring thrust to achieve an improved abutting of the piston ring, it is sufficient in accordance with the invention to provide the recesses in the thrust region, in order to intensify the abutting by the combustion pressure. FIG. 9 shows an example arrangement, in which the recesses are arranged at distances from one another and up to a maximum of 90° from the ring thrust. It generally applies that in accordance with the invention the arrangement and dimensioning of the recesses are selected dependent on the radial pressure distribution of the piston ring so that during the operation of the engine as much as possible the same contact pressure onto the cylinder wall or respectively bush is obtained at all locations of the piston ring.

In so far as not described explicitly differently, basically all the individual features of the described example embodiments can be combined arbitrarily with one another.

The invention claimed is:

1. A piston ring for a piston of a piston engine, comprising:
   an external circumferential surface;
   an internal circumferential surface;
   an upper flank pointing in the direction of a piston upper side; and
   a lower flank pointing in the direction of a piston underside;
   wherein
   the lower flank runs obliquely with respect to the upper flank, so that an axial height of the piston ring is greater at the external circumferential surface than an axial height at the internal circumferential surface; and
   in that on each side of a thrust of the piston ring there are a plurality of recesses, spaced apart from one another tangentially, in the upper flank, which extend into the external circumferential surface.

2. The piston ring according to claim 1, wherein the recesses are arranged in a range of 0-90° on both sides from the thrust.

3. The piston ring according to claim 1, wherein the distance of the recesses from the internal circumferential surface is at least ⅓ of the radial length of the upper flank.

4. The piston ring according to claim 1, wherein the upper flank forms a right angle with the internal circumferential surface.

5. The piston ring according to claim 1, wherein a chamfer of the lower flank is adapted to compensate the tilting of the corresponding piston groove of the piston in operation of the piston engine.

6. The piston ring according to claim 1, wherein the dimensions axial depth and/or radial width and/or tangential length of the recesses depend on the distance to the ring thrust and/or on the radial distance from the inner side of the piston ring.

7. The piston ring according to claim 1, wherein the number and/or the distances of the recesses depend on the distance to the ring thrust and/or on the radial distance from the inner side of the piston ring.

* * * * *